US010255021B2

(12) United States Patent
Makar et al.

(10) Patent No.: US 10,255,021 B2
(45) Date of Patent: Apr. 9, 2019

(54) LOW LATENCY SCREEN MIRRORING

(71) Applicant: QUALCOMM Incorporated, San Diego, CA (US)

(72) Inventors: Mina Ayman Saleh Yanni Makar, San Diego, CA (US); Xiaodong Wang, San Diego, CA (US); Hongyu Jiang, San Diego, CA (US); Na Yu, San Diego, CA (US); Vijayalakshmi Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 14/958,336

(22) Filed: Dec. 3, 2015

(65) Prior Publication Data
US 2016/0350056 A1 Dec. 1, 2016

Related U.S. Application Data

(60) Provisional application No. 62/167,765, filed on May 28, 2015.

(51) Int. Cl.
*G06T 1/20* (2006.01)
*G06F 3/14* (2006.01)
(Continued)

(52) U.S. Cl.
CPC ............... *G06F 3/1454* (2013.01); *G06T 1/20* (2013.01); *G09G 5/006* (2013.01); *G06F 9/452* (2018.02);
(Continued)

(58) Field of Classification Search
None
See application file for complete search history.

(56) References Cited

U.S. PATENT DOCUMENTS 5,784,035 A 7/1998 Hagiwara et al.
6,584,120 B1 * 6/2003 Shiomoto ........ H04N 21/23608
348/423.1
(Continued)

FOREIGN PATENT DOCUMENTS

EP 2804094 A1 11/2014

OTHER PUBLICATIONS

International Search Report and Written Opinion—PCT/US2016/032530—ISA/EPO—dated Aug. 5, 2016.
(Continued)

*Primary Examiner* — Nitin Patel
*Assistant Examiner* — Amen Bogale
(74) *Attorney, Agent, or Firm* — Loza & Loza, LLP

(57) ABSTRACT

Aspects of the present disclosure relate to graphics domain transmission methods that utilize an adaptive compression pipeline to achieve low latency screen mirroring between a source device and a sink device. A source device captures a plurality of graphics domain frames, each of the graphics domain frames including one or more graphics command tokens. The source device utilizes an adaptive compression pipeline to compress the graphics domain frames based on one or more characteristics of the frames, and the adaptive compression pipeline is configured to perform at least one of scalable texture streaming, frame-based prediction, frame dropping, or data compression. The source device transmits the compressed frames to a sink device, and displays a rendered image of the graphics domain frames in time synchronization with a corresponding rendered image of the compressed frames displayed at the sink device.

24 Claims, 13 Drawing Sheets

(51) Int. Cl.
*G09G 5/00* (2006.01)
*G09G 5/12* (2006.01)
*G06F 9/451* (2018.01)
*H04L 29/06* (2006.01)

(52) U.S. Cl.
CPC ........... *G09G 5/12* (2013.01); *G09G 2310/08* (2013.01); *G09G 2340/02* (2013.01); *G09G 2350/00* (2013.01); *G09G 2370/16* (2013.01); *H04L 69/04* (2013.01)

(56) References Cited

U.S. PATENT DOCUMENTS

| | | | | |
|---|---|---|---|---|
| 7,847,755 | B1* | 12/2010 | Hardebeck | G06F 3/1415 345/2.2 |
| 2009/0153585 | A1* | 6/2009 | Mahajan | G09G 5/006 345/629 |
| 2011/0034176 | A1* | 2/2011 | Lord | G06K 9/00993 455/450 |
| 2011/0078532 | A1 | 3/2011 | Vonog et al. | |
| 2013/0219072 | A1 | 8/2013 | Han et al. | |
| 2013/0238702 | A1 | 9/2013 | Sheth et al. | |
| 2014/0270680 | A1* | 9/2014 | Bloch | G11B 27/11 386/201 |
| 2014/0333640 | A1* | 11/2014 | Dodge | G06T 9/00 345/522 |
| 2015/0058450 | A1 | 2/2015 | Hahm et al. | |
| 2015/0061972 | A1 | 3/2015 | Seo et al. | |
| 2015/0179130 | A1 | 6/2015 | Smadi et al. | |

OTHER PUBLICATIONS

Loffler A., et al., "Networked Displays for VR Applications: Display as a Service", Internet Citation, Oct. 17, 2012 (Oct. 17, 2012), pp. 37-44, XP003035516, ISSN: 1727-530X, ISBN: 978-3-905674-40-8 Retrieved from the Internet: URL: http://diglib.eg.org/handle/10.2312/EGVE.JVRC12.037-044.

Nave I., et al., "Games@large Graphics Streaming Architecture ", IEEE International Symposium on Consumer Electronics, ISCE 2008, IEEE, Piscataway, NJ, USA, Apr. 14, 2008 (Apr. 14, 2008), pp. 1-4, XP031283619, ISBN: 978-1-4244-2422-1, abstract col. 2-col. 6.

Richardson T., et al., "Virtual Network Computing", IEEE Internet Computing, Institute of Electrical and Electronics Engineers, US, vol. 2, No. 1, Jan. 1, 1998 (Jan. 1, 1998), pp. 33-38, XP002142727, ISSN: 1089-7801, DOI: 10.1109/4236.656066.

\* cited by examiner

LOW LATENCY SCREEN MIRRORING

PRIORITY CLAIM

This application claims priority to and the benefit of provisional patent application No. 62/167,765 filed in the United States Patent and Trademark Office on 28 May 2015, the entire content of which is incorporated herein by reference.

TECHNICAL FIELD

The technology discussed below relates generally to streaming video or screen content data from a source device to a sink device with low latency.

BACKGROUND

With modern electronic devices, it sometimes occurs that a user desires to wirelessly display content, such as video, audio, and/or graphics content, from one electronic device on another electronic device. In many instances, the ability to convey the content wirelessly is also desired. Generally speaking, in such a wireless display system, a first wireless device "source device" may provide content via a wireless link to a second wireless device "sink device" where the content can be played back or displayed. The content may be played back at both a local display of the source device and at a display of the sink device simultaneously, also known as display or screen mirroring.

By utilizing wireless capabilities to form a wireless connection between the two devices, a source device can take advantage of better display and/or audio capabilities of a sink device (e.g., a digital television, projector, audio/video receiver, high-resolution display, etc.) to display content that is initially stored in, or streamed to, the source device. As the demand for such technologies continues to increase, research and development continue to advance and enhance the user experience.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure relate to graphics domain transmission methods that utilize an adaptive compression pipeline to achieve low latency screen mirroring between a source device and a sink device.

In one aspect of the disclosure, a source device includes a communications interface, a memory storing executable code, and at least one processor communicatively coupled to the communications interface and the memory. The at least one processor and the memory are configured to capture a plurality of graphics domain frames, each of the graphics domain frames including one or more graphics command tokens. The at least one processor and the memory are configured to utilize an adaptive compression pipeline to compress the plurality of graphics domain frames based on one or more characteristics of the frames. The adaptive compression pipeline is configured to perform at least one of scalable texture streaming, frame-based prediction, frame dropping, or data compression. The at least one processor and the memory are configured to transmit the compressed frames via the communications interface to a sink device, and display a rendered image of the graphics domain frames in time synchronization with a corresponding rendered image of the compressed frames displayed at the sink device.

In one aspect of the disclosure, a sink device includes a communications interface, a memory including executable code, and at least one processor communicatively coupled to the communications interface and the memory. The at least one processor and the memory are configured to receive a plurality of graphics domain frames from a source device via the communications interface. Each of the graphics domain frames includes one or more graphics command tokens, and the plurality of graphics domain frames are compressed by an adaptive compression pipeline including at least one of scalable texture streaming, frame-based prediction, frame dropping, or data compression. The at least one processor and the memory are configured to selectively display at least some of the plurality of graphics domain frames based on a timestamp of each of the plurality of frames.

An aspect of the disclosure provides a method of screen mirroring operable at a source device. An exemplary source device captures a plurality of graphics domain frames of screen content, each of the frames including one or more graphics command tokens. The source device utilizes an adaptive compression pipeline to compress the plurality of graphics domain frames based on one or more characteristics of the frames. The adaptive compression pipeline is configured to perform at least one of scalable texture streaming, frame-based prediction, frame dropping, or data compression. The source device transmits the compressed frames via a communications interface of the source device to a sink device, and displays a rendered image of the frames in time synchronization with a corresponding rendered image of the compressed frames displayed at the sink device.

An aspect of the disclosure provides a method of screen mirroring operable at a sink device. An exemplary sink device receives a plurality of graphics domain frames from a source device via a communications interface of the sink device. Each of the graphics domain frames includes one or more graphics command tokens, and the plurality of graphics domain frames are compressed at the source device by an adaptive compression pipeline including at least one of scalable texture streaming, frame-based prediction, frame dropping, or data compression. The sink device selectively displays at least some of the plurality of graphics domain frames based on a timestamp of each of the plurality of graphics domain frames.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well-known circuits, structures, techniques and components are shown in block diagram form to avoid obscuring the described concepts and features.

Figure 1:
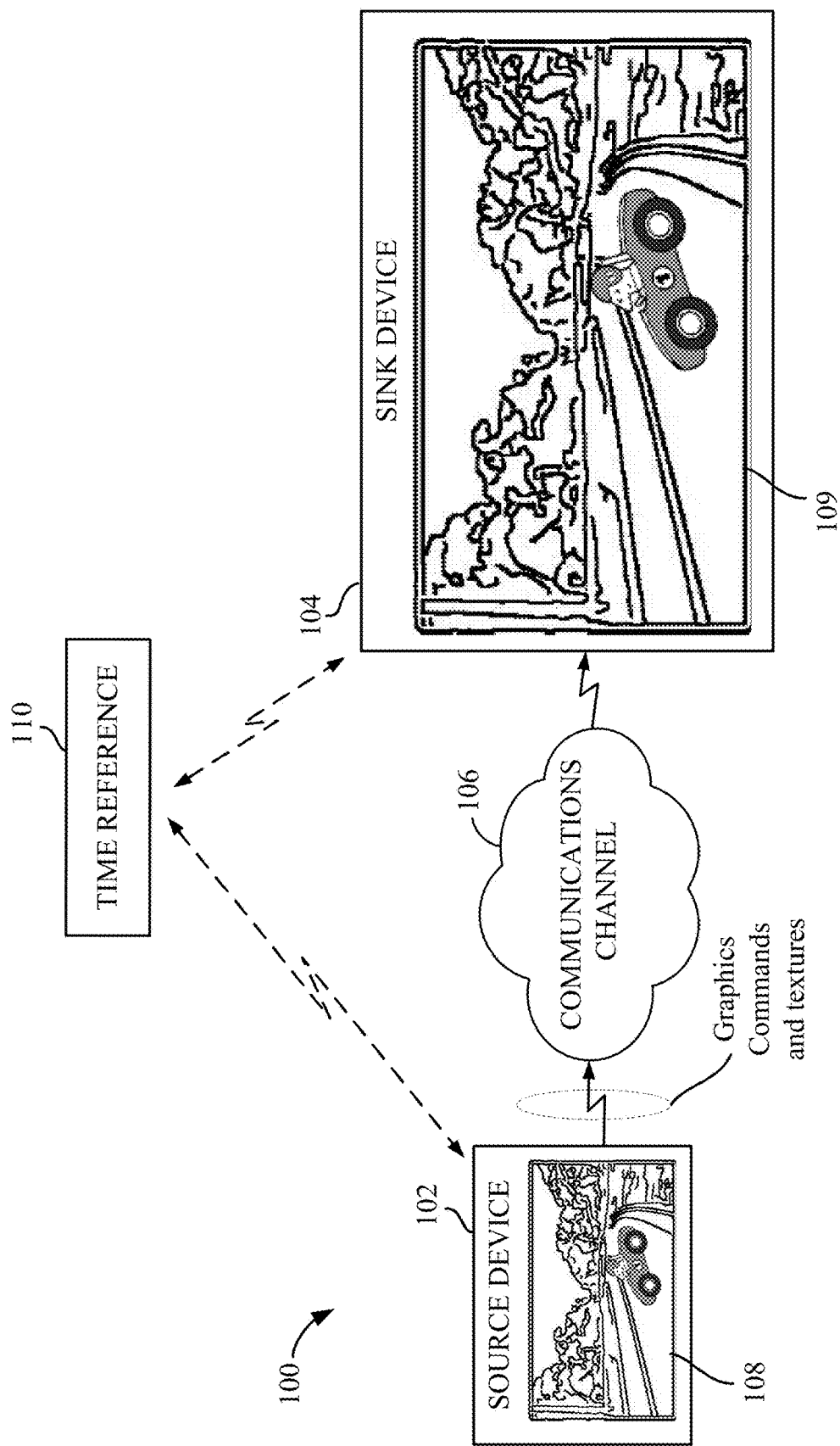
FIG. 1 is a block diagram of an example screen mirroring system in which a source device is configured to transmit compressed graphics domain frames including graphics commands to a sink device over a communications channel, in accordance with one or more aspects of this disclosure.

The various concepts and features presented throughout this disclosure may be implemented across a broad variety of wireless communications systems, network architectures, and communications standards. Referring now to FIG. 1, a diagram of an example wireless display system 100 in accordance with one or more techniques of the disclosure is illustrated. The wireless display system 100 utilize an adaptive compression pipeline to facilitate wireless transmission of graphics domain frames containing graphics commands from a source device 102 to a sink device 104 over a wireless communications channel 106. The adaptive compression pipeline is configured to reduce the latency of the transmission. While various aspects of this disclosure are illustrated with a wireless display system utilizing a wireless communications channel, the concepts are not limited to a wireless communications channel and may be implemented with non-wireless communications channels.

The source device 102 may be an electronic device configured to transmit screen content data 108 (e.g., video and audio/visual media) to a sink device 104 over a communications channel 106. Examples of a source device 102 include, but are not limited to devices such as smartphones or other mobile handsets, tablet computers, laptop computers, e-readers, digital video recorders (DVRs), desktop computers, wearable computing devices (e.g., smart watches, smart glasses, and the like), and/or other communication/computing device that communicates, at least partially, through wireless communications.

The sink device 104 may be an electronic device adapted to receive the screen content data 108 (e.g., streaming video or audio/visual media) conveyed or transmitted over the communications channel 106 from the source device 102. Examples of a sink device 104 may include, but are not limited to devices such as smartphones or other mobile handsets, tablet computers, laptop computers, e-readers, digital video recorders (DVRs), desktop computers, wearable computing devices (e.g., smart watches, smart glasses, and the like), televisions, monitors, and/or other communication/computing device with a visual display and with wireless communications capabilities.

The wireless communications channel 106 may include one or more channels capable of propagating communicative signals between the source device 102 and the sink device 104. In some examples, the communications channel 106 may be a wireless communications channel. For example, the wireless communications channel 106 may be implemented in radio frequency communications in one or more frequency bands, such as the 2.4 GHz band, 5 GHz band, 60 GHz band, or other licensed/unlicensed frequency bands. In some examples, the communications channel 106 may comply with one or more sets of standards, protocols, or technologies such as wireless universal serial bus (WUSB) (as promoted by the Wireless USB Promoter Group), Wi-Fi (as promoted by the Wi-Fi Alliance), WiGig (as promoted by the Wireless Gigabit Alliance), and/or the Institute of Electrical and Electronics Engineers (IEEE) 802.11 set of standards (e.g., 802.11, 802.11a, 802.11b, 802.11g, 802.11n, 802.11ac, 802.11ad, 802.11mc, etc.), as well as one or more other standards, protocols, or technologies. The frequency bands used, such as the 2.4 GHz, 5 GHz, and 60 GHz bands, may be defined for purposes of this disclosure as they are understood in light of the standards of Wi-Fi, WiGig, any one or more IEEE 802.11 protocols, or other applicable standards or protocols.

As depicted by FIG. 1, the source device 102 may have screen content data 108 to be conveyed. The source device 102 can convey or transmit the screen content data 108 (e.g., video) via the wireless communications channel 106 to the sink device 104, which may display a corresponding screen content data 109. The source device 102 and sink device 104 may be time-synchronized to a time reference 110 such that the screen content data 108, 109 may be displayed on both devices in a time synchronized fashion (e.g., simultaneously displayed).

In some aspects of the disclosure, a "graphics domain" transmission method may be used by the source device 102 to stream the screen content data 108 as deconstructed graphics domain frames to the sink device 104. Graphics domain transmissions may be accomplished by capturing the screen content data 108 (e.g., video) at the source device (e.g., at an input of a GPU of the source device 102) in the form of graphics command tokens (e.g., OpenGL commands) and/or texture elements, and conveying the command tokens and texture elements to the sink device 104 via the communications channel 106.

One example of graphics domain transmission standard is OpenGL (Open Graphics Library) that is a specification of an API (application programming interface) for rendering graphics (e.g., 2D and 3D graphics, or video). OpenGL implementations provide libraries that implement the API defined by the specification, which is maintained by the OpenGL Architectural Review Board. A command token is a group of bytes or data corresponding to one OpenGL command. The sink device 104 (e.g., a GPU at the sink device 104) may render the command tokens and texture elements into displayable frames, and output the rendered frames on a display of the sink device 104. Texture elements may be mapped onto the corresponding surfaces of objects in the rendered image. Texture elements can add various details to the objects such as lighting effects, colors, textures, patterns, etc. This "graphics domain" transmission method may be referred to as a graphics offloading method in this disclosure.

In this specification, a frame containing graphic command tokens (e.g., OpenGL commands) is called a graphics domain frame that is different from a displayable frame or rendered frame containing rendered graphics or images. A rendered image or frame contains the data of each pixel of the image to be displayed. Non-limiting examples of rendered graphics are raster graphics and bitmapped graphics. In this specification, a rendered frame is a data structure representing a plurality of pixels viewable via a display, monitor, or other display medium. However, in a graphics domain transmission method, the sink device 104 receives the graphic command tokens and texture elements, and performs a series of computation and/or mathematical approximation to render a finalized image (e.g., displayable frame) based on received graphics command tokens. During this rendering process, the entire image's spatial, textural, and/or lighting information are combined to determine the color value of each pixel in the displayed image.

Graphics domain transmission methods are different from rendered image transmissions in several aspects. For example, if the sink device 104 employs a display with a greater resolution than the source device 102, the sink device 104 can employ the graphics command tokens (e.g., tokens of OpenGL commands) and texture elements to render the graphics domain frame at a higher resolution with similar quality. Another example includes the ability to send a texture element that may be used in multiple frames, enabling the source device 102 to send the texture element a single time to be employed by the sink device 104 to render several different frames. In some aspects of the disclosure, the graphics domain transmission method may utilize an adaptive compression pipeline (e.g., a graphics compression pipeline) at the source device 102. The adaptive compression pipeline receives and processes graphics commands (graphics domain frames), and may store the commands for future processing or execute the commands immediately. Examples of the adaptive compression pipeline will be described in detail below.

Figure 2:
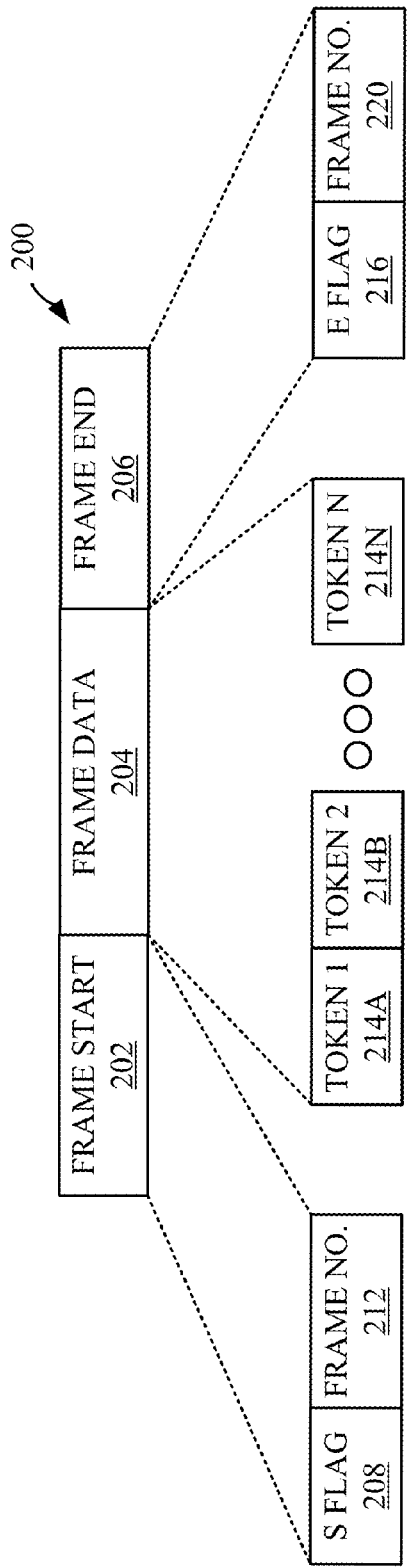
FIGS. 2 and 3 are diagrams illustrating an example of a command frame in accordance with an aspect of the disclosure.

Turning to FIG. 2, a block diagram is depicted, illustrating an example of a graphics domain frame 200 that may be output by the source device 102 to stream screen content data 108 (e.g., video or audio/visual media) to the sink device 104 using a graphics domain transmission method, according to at least one example of the present disclosure. As illustrated, the graphics domain frame 200 can include a frame start field 202, a frame data field 204, and a frame end field 206. In one particular example, the graphics domain frame 200 may be an OpenGL command frame.

The frame start field 202 may include a start flag 208 and a frame number field 212. The frame start field 202 may indicate the beginning of a graphics domain frame 200 (e.g., within a data stream or transmission). The frame number field 212 may indicate a sequence number of the graphics domain frame 200. The value of the frame number field 212 may increment for subsequent frames. For instance, the value of the frame number field 212 may be f for a current frame and f+1 for a next frame (e.g., f is a non-negative integer).

The frame data field 204 may include one or more graphics command tokens 214A-214N (collectively, "tokens 214"). Each of the tokens 214 may correspond to a particular token of a graphics command. Further details of one example of a token of the tokens 214 are provided below with reference to FIG. 3.

The frame end field 206 may include an end flag 216 and a frame number field 220. The end flag 216 may indicate the beginning of the frame end field 206 (e.g., within a data stream). The frame number field 220 may indicate a sequence number of the command frame 200. In one example, the frame number fields 212 and 220 may have the same frame number such that the receiver may determine the frame number by looking at either or both fields.

Figure 3:
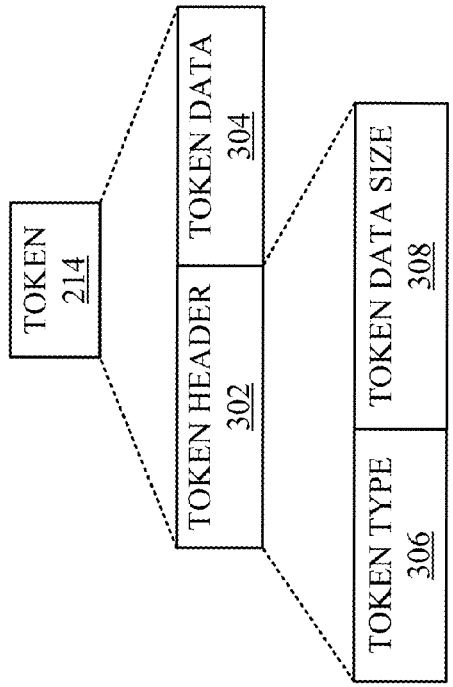

FIG. 3 is a diagram illustrating further details of one example of a graphics command token, in accordance with one or more aspects of this disclosure. As illustrated in FIG. 3, the token 214 may include a token header field 302 and a token data field 304. The token header field 302 may indicate one or more characteristics of the token 214. In some examples, the token header field 302 may have a fixed length, such as 12 bytes or any other suitable length. As illustrated in FIG. 3, the token header field 302 may include a token type field 306 and a token data size field 308. The token type field 306 may indicate which graphics command among a set of graphics commands corresponds to the token 214. That is, the token type field 306 may indicate which graphics command the token 214 is a token of. The token data size field 308 may indicate a size of the token data field 304 (e.g., in bytes).

The token data field 304 may indicate one or more arguments or data for the token 214. For instance, if the graphics command type indicated by the token type field 306 takes two arguments, the token data field 304 may include the data for the two arguments. The token data field 304 may also include a timestamp (e.g., a presentation timestamp) indicating a specific time that the corresponding frame will be displayed.

As noted above, graphics domain transmissions enable the source device 102 to transmit graphics command tokens (e.g., OpenGL command tokens) and texture elements, where the same texture elements may be used in one or more frames. Such graphics domain transmissions can enable the source device 102 to transmit the texture element a single time to be employed by the sink device 104 to render several different frames. In some instances, the texture elements may be relatively large in size, compared to the graphics command tokens. The relatively large size of the texture elements can result in peaks of data that are transmitted by the source device 102.

Figure 4:
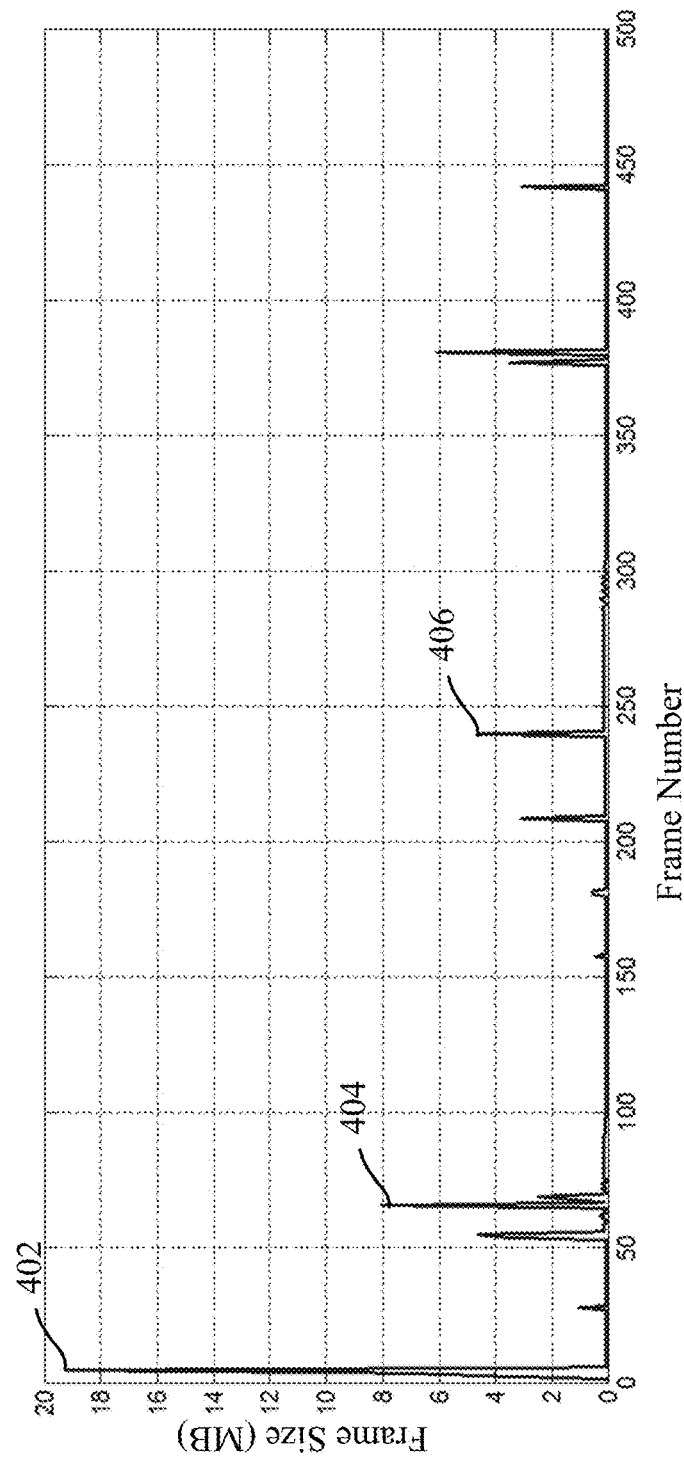
FIG. 4 is a graph illustrating frame sizes over time when initiating screen sharing or mirroring for an application in accordance with an aspect of the disclosure.

For example, FIG. 4 is a graph illustrating graphics domain frame sizes over time when performing screen sharing or mirroring for a certain application. For example, the application may be a video game, video streaming, slideshow, and the like. As shown, there are several data peaks for example during game play or audio/video streaming. For instance, there is a peak 402 at the beginning of around 19 Megabytes (MB) of data that is transmitted when the game is initiated. This may include several texture elements, such as the background of the game and different objects used for rendering the frames in the game. These texture elements typically need to be available at the sink device 104 before it can start displaying the game. Other data peaks 404 and 406 also can occur during other times of the game. Outside of the relatively larger data peaks, the other graphics domain frames (e.g., with graphics command tokens) may be relatively small in size. In some instances, the relatively large frames at the data peaks may result in delays in transmissions. For example, assuming an available bandwidth or bit-rate is 200 Megabits per second (Mbps), there would be a significant delay between the data transmitted by the source device 102 and the data received by the sink device 104.

The above-described delay between the data transmitted at the source device 102 and the data arriving at the sink device 104 may cause a latency between the video or images displayed at the source device and that of the sink device. Such delay will be referred to as screen mirroring latency in this specification. Undesirably long screen mirroring latency can adversely affect certain applications such as highly interactive applications and video gaming for example.

According to aspects of the present disclosure, a source device is configured to offload graphics rendering to a sink device utilizing an adaptive compression pipeline that can perform screen mirroring with zero or a small (e.g., non-perceptible) screen-to-screen latency. For example, a small or non-perceptible screen-to-screen latency may be 5 milliseconds or less. Screen-to-screen latency (or display-to-display latency) refers to the latency or time delay between a frame displayed on the source device and the corresponding frame displayed on the sink device. The adaptive compression pipeline may be configured to selectively utilize various compression tools or techniques to reduce screen-to-screen latency. Examples of these compression tools include scalable texture streaming, frame-based prediction, frame dropping, and lossless and/or lossy compression techniques. The application of these compression tools and techniques will be described in more detail below.

Figure 5:
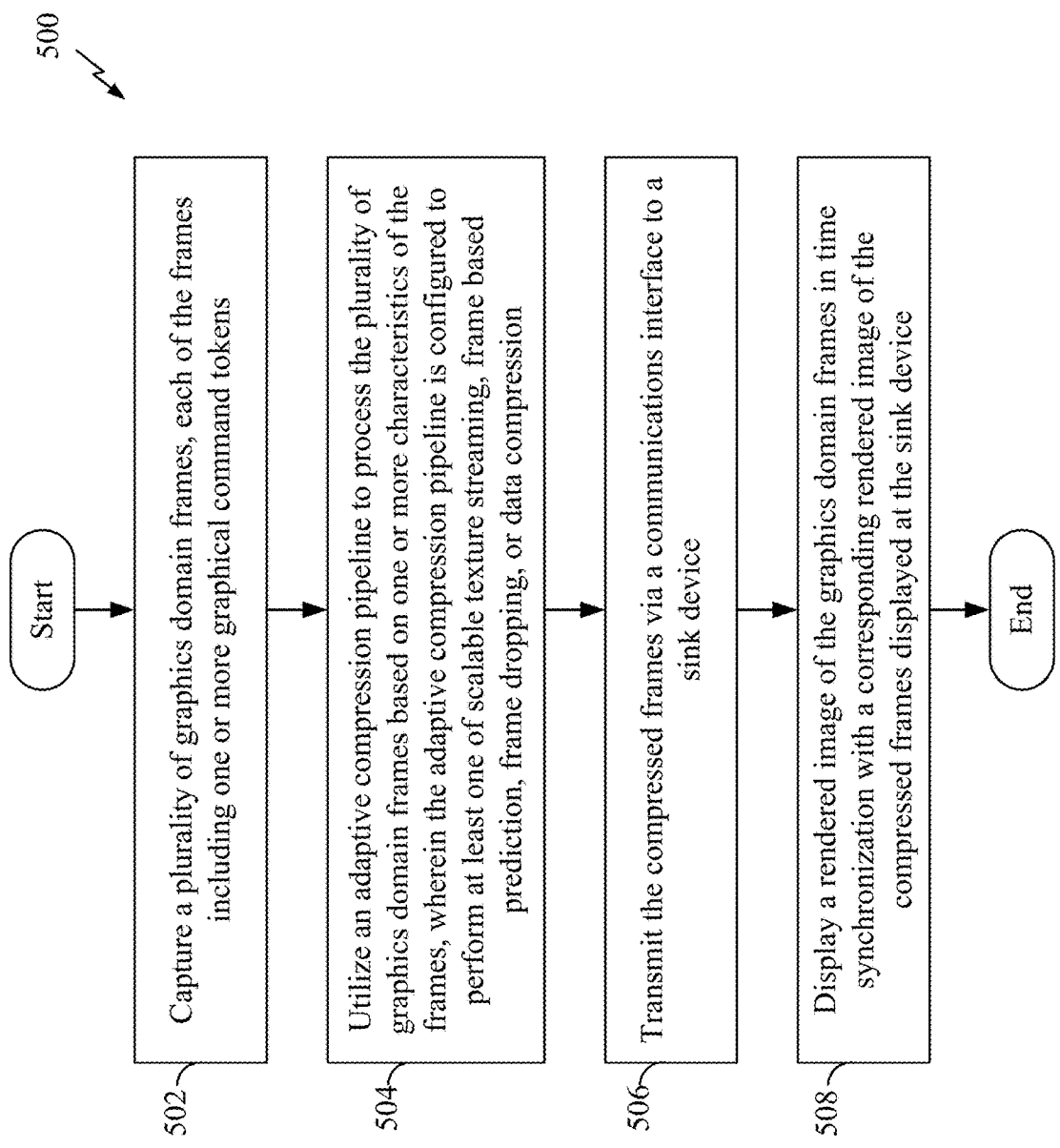
FIG. 5 is a flow chart illustrating a screen mirroring method utilizing an adaptive compression pipeline in accordance with aspects of the disclosure.
Figure 6:
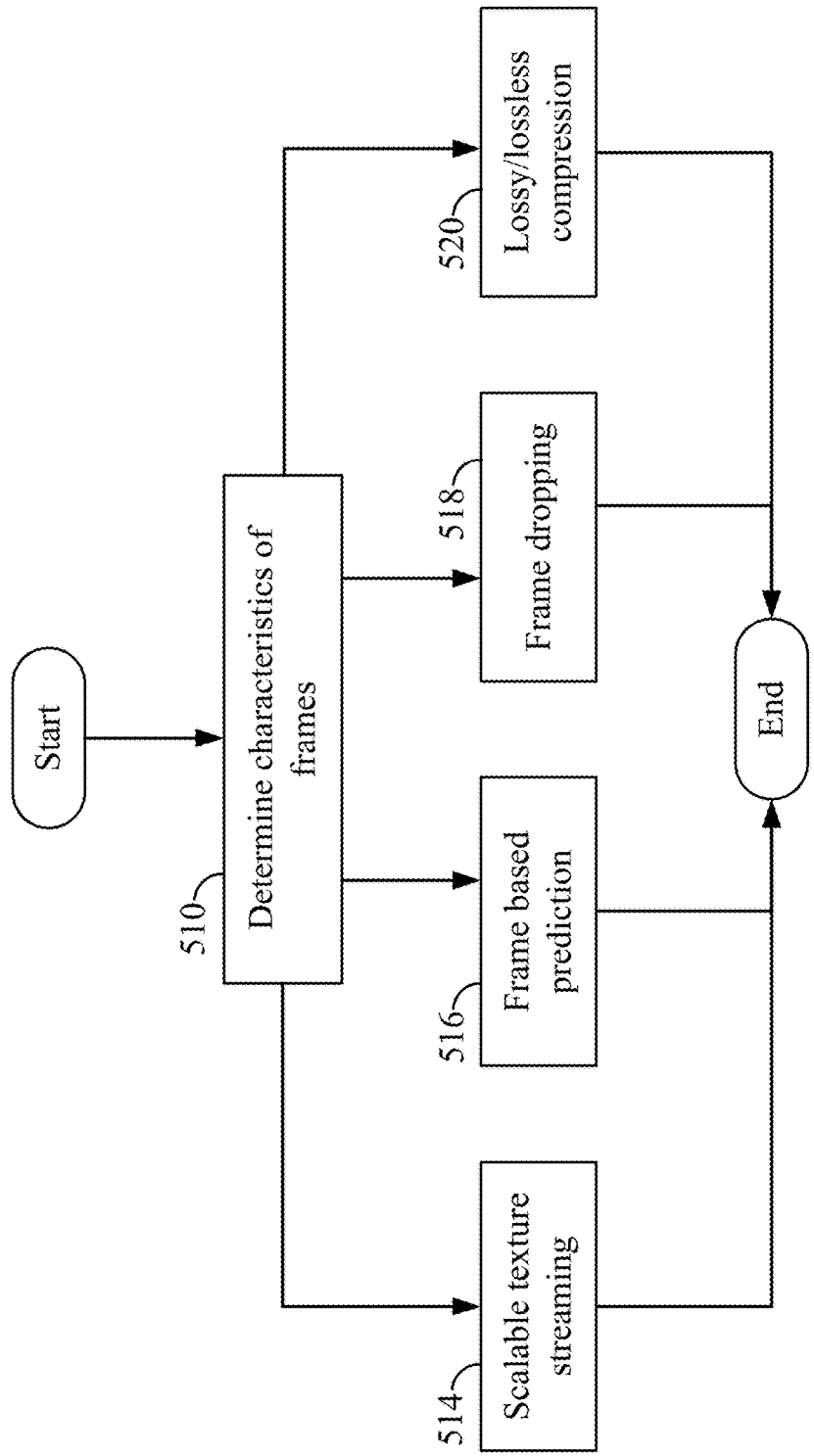
FIG. 6 is a flow chart illustrating an adaptive compression pipeline in accordance with an aspect of the disclosure.

FIGS. 5 and 6 are flow charts illustrating a screen mirroring method 500 utilizing an adaptive compression pipeline in accordance with aspects of the present disclosure. The screen mirroring method 500 may be performed by a source device illustrated in any of FIGS. 1, 7, and/or 8, or any suitable apparatus. At block 502, the source device captures a plurality of graphics domain frames of screen content data or video data. For example, one or more applications (e.g., applications modules 620 of FIG. 6) operating at the source device may generate one or more graphical command tokens (e.g., OpenGL command tokens) and textures. These graphical command tokens maybe stored and/or grouped into one or more graphics domain frames for further processing. Here, each captured frame includes one or more graphics command tokens and/or textures. For example, the screen content data may be the video data 108 of FIG. 1 or any suitable streaming media data. The source device may utilize a data streaming module 610 to capture a graphics domain frame by retaining, transmitting, conveying, and/or storing the corresponding graphics command tokens and/or textures of the frame at the input of a GPU (e.g., GPU 608 of FIGS. 7 and 8) of the source device. The captured graphics domain frames may be stored at a memory storage (e.g., storage medium 606 of FIG. 7) for further processing.

At block 504, the source device utilizes an adaptive compression pipeline to process or compress the plurality of graphics domain frames based on one or more characteristics of the frames. For example, the source device may implement the adaptive compression pipeline shown in FIG. 6. The adaptive compression pipeline may process or compress the frames by at least one of scalable texture streaming, frame-based prediction, frame dropping, and/or lossy/lossless data compression. Referring to FIG. 6, at block 510, the source device may utilize a data streaming logic 624 (see FIG. 8) to determine the characteristics of the frames. Non-limiting examples of the characteristics include frame number, frame length, differences and/or similarities of data between adjacent frames, presence of textures, number of command tokens contained in a frame, and presentation timestamp. Based on the characteristics of the frames, the source device may compress the frames utilizing scalable texture streaming (block 514), frame-based prediction (block 516), frame dropping (block 518), or lossy/lossless data compression (block 520). Each of these compression tools and techniques may be utilized by the source device to compress or reduce the size of the frames, and will be described in further detail below.

Referring back to FIG. 5, at block 506, the source device transmits the compressed graphics domain frames via a communications interface to a sink device. The sink device may be the sink device 104 of FIG. 1 or any suitable apparatus. In one example, the source device may utilize a transmitter 614 (FIGS. 7 and 8) to transmit the compressed frames. The compressed frames may be loaded into a buffer of the transmitter 614, and processed (e.g., digital-to-analog conversion, modulation and frequency conversion) into a suitable signal for transmission through a wireless communications channel.

Figure 8:
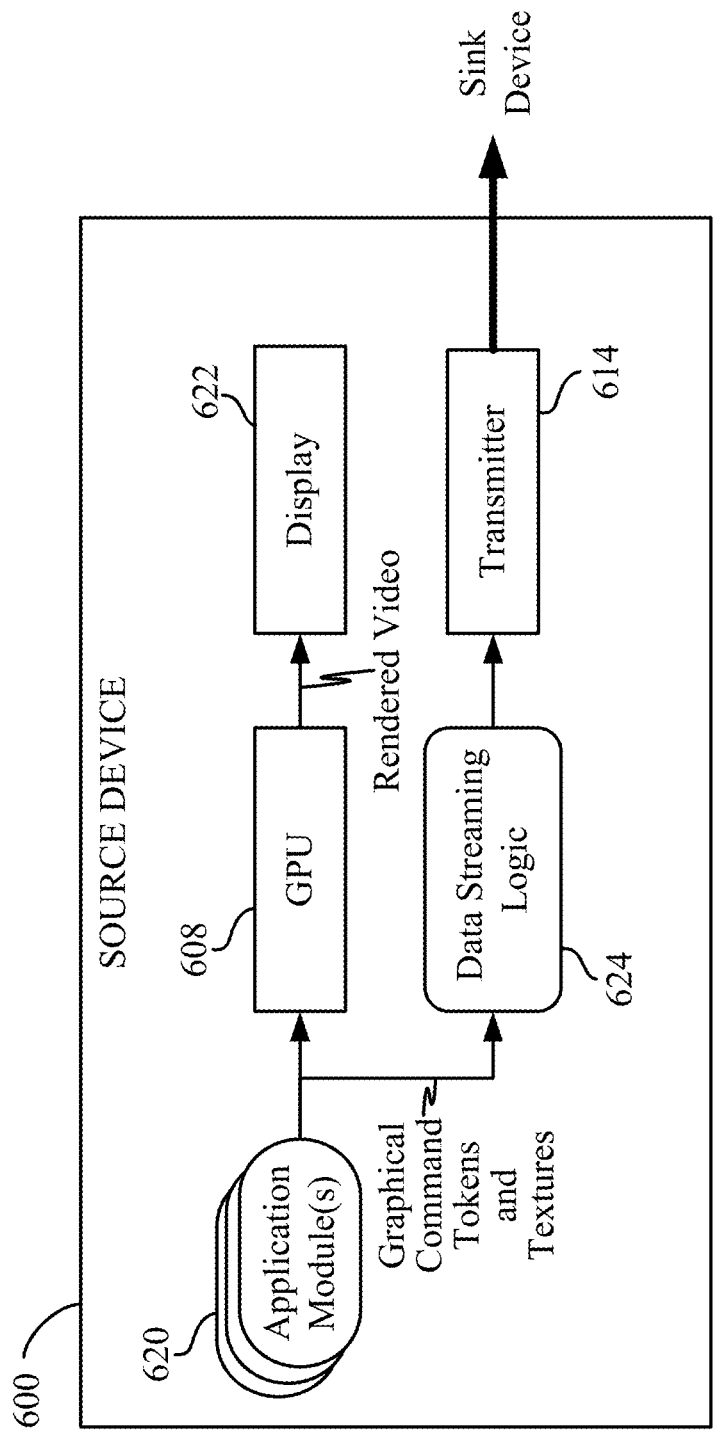
FIG. 8 is a block diagram illustrating an example frame data flow within a source device in accordance with an aspect of the present disclosure.

At block 508, the source device displays a rendered image of the graphics domain frames in time synchronization with a corresponding rendered image of the compressed frames displayed at the sink device. The rendered images are considered time synchronized when the time lag between the displayed images is within a predetermined threshold (e.g., 5 milliseconds or less). In one particular example, the rendered images may be displayed simultaneously. For example, the source device may render the graphics domain frames utilizing a GPU 608 (FIG. 8) and displays the rendered image on a display 622 (FIG. 8). The source device and the sink device may be synchronized in time to a common time reference such that both devices can display the desired image at substantially the same time, for example, according to the presentation timestamp of the frames.

According to the method 500 described in reference to FIGS. 5 and 6, the described adaptive compression pipeline enables the graphics domain frames (i.e., frames including command tokens) to be compressed and transmitted through the communications channel in less time relative to uncompressed frames. Therefore, screen mirroring latency may be reduced. The reduced latency of the graphics pipeline facilitates the synchronized display of the graphics domain frames on both the source device and the sink device without perceptible delay between the devices.

Figure 7:
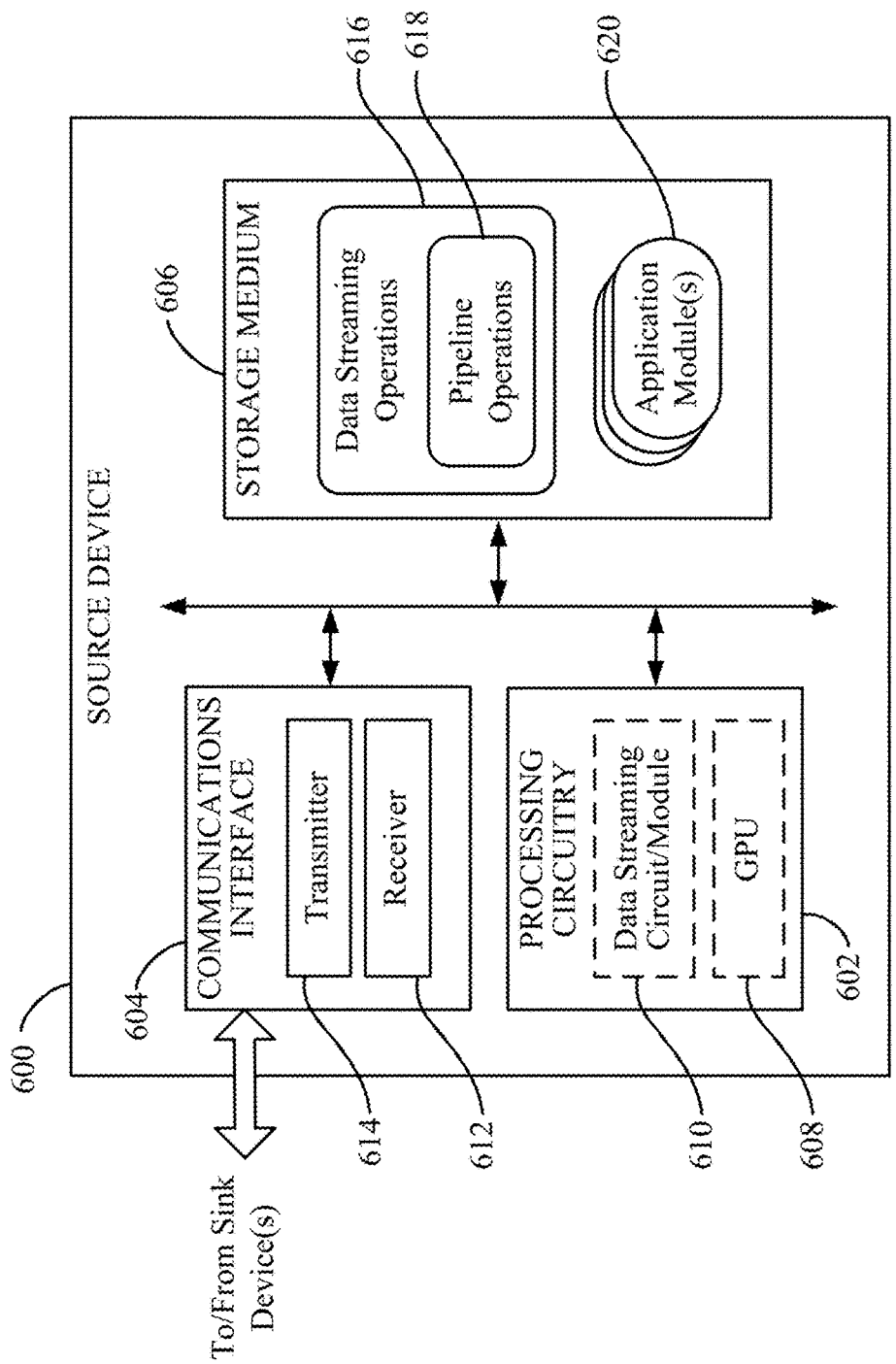
FIG. 7 is a block diagram illustrating select components of a source device configured to stream video in accordance with aspects of the disclosure.

FIG. 7 is a block diagram illustrating select components of a source device 600 according to an aspect of the disclosure. The source device 600 includes processing circuitry 602 operatively coupled to or placed in electrical communications with a communications interface 604 and a storage medium 606. The processing circuitry 602 includes circuitry arranged to obtain, process and/or send data, control data access and storage, issue commands, and control other desired operations. The processing circuitry 602 may include circuitry adapted to implement desired programming provided by appropriate media, and/or circuitry adapted to perform one or more functions and processes described in this disclosure, for example, in FIGS. 5, 6, and 8-13.

For example, the processing circuitry 602 may be implemented as one or more processors, one or more controllers, and/or other structure configured to execute executable software, programming, codes, and/or execute specific functions. Examples of the processing circuitry 602 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuitry 602 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuitry 602 are for illustration and other suitable configurations within the scope of the present disclosure are also contemplated.

The processing circuitry 602 can include circuitry adapted for processing data, including the execution of programming or code, which may be stored on the storage medium 606. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuitry 602 may include a graphics processing unit (GPU) 608 and/or a video data streaming circuit or module 610. The GPU 608 generally includes circuitry and/or programming (e.g., programming stored on the storage medium 606) adapted for processing graphics data and rendering frames of graphics or screen content data based on one or more graphics command tokens one and/or texture elements for display by a user interface, screen, monitor, or an output device.

The data streaming circuit/module 610 may include circuitry and/or programming (e.g., programming stored on the storage medium 606) adapted to stream video data or screen content data in the form of graphics command tokens and texture elements to a sink device. In some examples, the data streaming circuit/module 610 may encapsulate the one or more graphics command tokens and/or textures in a command frame, such as the graphics domain frame 200 of FIG. 2. In some examples, the data streaming circuit/module 610 may capture the graphics command tokens and/or texture elements at an input of the GPU 608 or other graphic processing circuitry. In some examples, the data streaming circuit/module 610 may implement an adaptive compression pipeline configured to compress graphics command frames utilizing one or more of scalable texture streaming, frame-based prediction, frame dropping, and/or lossy/lossless data compression, based on the characteristics of the frames, as described in more detail herein below. As used herein, reference to circuitry and/or programming associated with the source device 600 and the processes performed may be generally referred to as logic (e.g., logic gates and/or data structure logic).

The communications interface 604 is configured to facilitate wireless communications of the source device 600. For example, the communications interface 604 may include circuitry and/or programming adapted to facilitate the communications of information bi-directionally with respect to one or more sink devices. The communications interface 604 may be coupled to one or more antennas (not shown), and includes wireless transceiver circuitry, including at least one receiver 612 (e.g., one or more receiver chains) and/or at least one transmitter 614 (e.g., one or more transmitter chains). In some aspects of the disclosure, the communications interface 604 may include suitable transmitters and receivers for wired communications (e.g., Universal Serial Bus (USB), Ethernet, PCI Express, Thunderbolt, etc.)

The storage medium 606 may represent one or more processor-readable devices for storing programming, such as processor executable code or instructions (e.g., software, firmware), electronic data, databases, or other digital information. The storage medium 606 may also be used for storing data (e.g., screen content data, scalable streaming flag, frames) that is manipulated or processed by the processing circuitry 602 when executing programming or code such as compression pipeline operations 618. The storage medium 606 may be any available media that can be accessed by a general purpose or special purpose processor, including portable or fixed storage devices, optical storage devices, and various other mediums capable of storing, containing and/or carrying programming or code. By way of example and not limitation, the storage medium 606 may include a processor-readable non-transitory storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 606 may be coupled to the processing circuitry 602 such that at least some of the processing circuitry 602 can read information from, and write information to, the storage medium 606. That is, the storage medium 606 can be coupled to the processing circuitry 602 so that the storage medium 606 is at least accessible by the processing circuitry 602, including examples where the storage medium 606 is integral to the processing circuitry 602 and/or examples where the storage medium 606 is separate from the processing circuitry 602 (e.g., resident in the source device 600, external to the source device 600, distributed across multiple entities).

The storage medium 606 may include programming or code stored thereon. Such programming, when executed by the processing circuitry 602, can cause the processing circuitry 602 to perform one or more of the various functions and/or process steps described herein for example in FIGS. 1, 5, 6, and 10-13. In at least some examples, the storage medium 606 may include data streaming operations 616. The data streaming operations 616 are adapted to cause the processing circuitry 602 to stream screen content data (e.g., video data) in the form of graphics domain frames containing graphics command tokens and texture elements to a sink device via the communications interface 604. In some examples, the data streaming operations 616 may include compression pipeline operations 618 adapted to cause the processing circuitry 602 to adaptively compress the frames containing graphics command tokens and textures based on one or more characteristics of the frames, utilizing one or more of scalable texture streaming, frame-based prediction, frame dropping, or lossy/lossless data compression, as described in more detail herein below. The storage medium 606 may also include data that are generated or utilized by the data streaming operations. For example, the storage medium 606 may have a scalable streaming flag for indicating whether or not scalable streaming should be applied to the frame.

The storage medium 606 may also include application modules 620 which may each represent an application provided by an entity that manufactures the source device 600, programming operating on the source device 600, and/or an application developed by a third-party for use with the source device 600. Examples of application modules 620 may include applications for gaming, shopping, travel routing, maps, audio and/or video presentation, word processing, spreadsheets, voice and/or calls, weather, etc. One or more application modules 620 may include or generate texture elements (textures) associated with the application modules and the applications.

In one example, where a gaming application of the application modules 620 entails the slicing of falling fruit (e.g., watermelons, avocados, pineapples, etc.), there may be texture elements associated with the gaming application that may include a graphical representation of each type of fruit, as well as backgrounds. Such texture elements may be stored in different color spaces and with different bit depths of their corresponding color channels.

According to one or more aspects of the present disclosure, the processing circuitry 602 is adapted to perform (independently or in conjunction with the storage medium 606) any or all of the processes, functions, steps and/or routines for any or all of the source devices described herein. As used herein, the term "adapted" or "configured" in relation to the processing circuitry 602 may refer to the processing circuitry 602 being one or more of configured, employed, implemented, and/or programmed (in conjunction with the storage medium 606) to perform a particular process, function, step and/or routine according to various features described herein, for example, in FIGS. 5, 6, and 10-13.

FIG. 8 is a block diagram illustrating an example data flow within the source device 600 according to one aspect of the present disclosure. The source device 600 may be the same as the source device of FIG. 7. As shown, one or more of the application modules 620 of the source device 600 may output graphics domain frames containing graphics command tokens and textures, e.g., to the GPU 608. In some examples, the GPU 608 may render these frames and output the rendered video or images to a display 622 or an output device. In some examples, the GPU 608 may not render the graphics domain frames, but stream them to a sink device. In accordance with one or more aspects of this disclosure, a data streaming logic 624 (e.g., implemented by the data streaming circuit/module 610 and/or the data streaming operations 616) may capture the graphics domain frames at an input of the GPU 608. The captured frames may be stored at the storage medium 606 or buffered in the data streaming logic 624. The data streaming logic 624 may compress the graphics domain frames utilizing an adaptive compression pipeline implemented to perform at least one of scalable texture streaming, frame-based prediction, frame dropping, and/or lossy/lossless data compression, based on the characteristics of the frames. The compressed frames are output to the transmitter 614. In one example, the data streaming logic 624 may generate compressed graphics command tokens and textures associated with a plurality of frames making up a sequence of frames. The transmitter 614 can output the compressed frames containing graphics command tokens and textures to a sink device (e.g., sink device 700 of FIG. 9).

Figure 9:
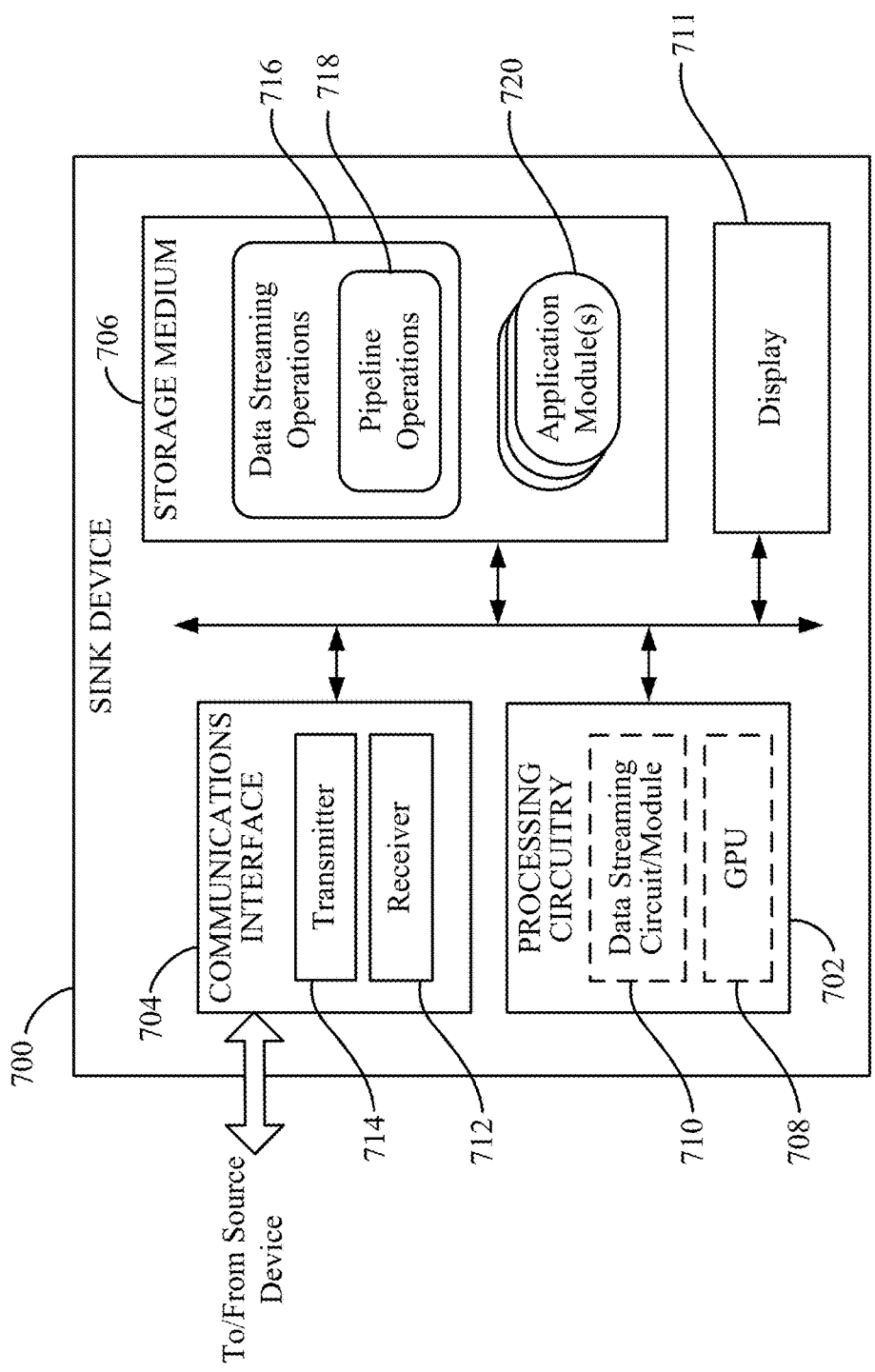
FIG. 9 is a block diagram illustrating select components of a sink device configured to perform screen mirroring in accordance with an aspect of the disclosure.

FIG. 9 is a block diagram illustrating select components of a sink device 700 configured to perform screen mirroring in accordance with an aspect of the disclosure. The sink device 700 includes processing circuitry 702 operatively coupled to or placed in electrical communications with a communications interface 704 and a storage medium 706. The processing circuitry 702 includes circuitry arranged to obtain, process, transmit and/or receive data, control data access and storage, issue commands, and control other desired operations. The processing circuitry 702 may include circuitry adapted to implement desired programming provided by appropriate media, and/or circuitry adapted to perform one or more functions described in this disclosure, for example, in FIGS. 1 and 14. Some components of the sink device 700 are similar to those of the source device 600, and redundant description will be omitted for brevity.

In some instances, the processing circuitry 702 may include a graphics processing unit (GPU) 708 and/or a data streaming circuit or module 710. The GPU 708 generally includes circuitry and/or programming (e.g., programming stored on the storage medium 706) adapted for processing graphics data and rendering graphics domain frames of video data or screen content data based on one or more graphics command tokens and texture elements for display by a display 711 or output device.

The data streaming circuit/module 710 may include circuitry and/or programming (e.g., programming stored on the storage medium 706) adapted to receive graphics domain frames (e.g., frames 200 of FIG. 2) containing graphics command tokens and/or textures from a source device (e.g., source device 600). The data streaming circuit/module 710 may provide the graphics domain frames containing graphics command tokens and/or textures to a GPU 708, which renders the frames to be displayed by the display 711. In some examples, the data streaming circuit/module 710 may include circuitry configured to drop one or more frames based on the frames' presentation timestamp.

The communications interface 704 is configured to facilitate wireless communications with a source device. For example, the communications interface 704 may include circuitry and/or programming adapted to facilitate the communications of information bi-directionally with respect to one or more source devices 600. The communications interface 704 may be coupled to one or more antennas (not shown), and includes wireless transceiver circuitry, including at least one receiver 712 (e.g., one or more receiver chains) and/or at least one transmitter 714 (e.g., one or more transmitter chains).

The storage medium 706 may represent one or more processor-readable devices for storing programming, such as processor executable code or instructions (e.g., software, firmware), electronic data, databases, or other digital information. The storage medium 706 may also be used for storing data (e.g., graphics domain frames received from a source device) that is manipulated by the processing circuitry 702 when executing programming or code. The storage medium 706 may be any available media that can be accessed by a general purpose or special purpose processor, including portable or fixed storage devices, optical storage devices, and various other mediums capable of storing, containing and/or carrying programming or code. By way of example and not limitation, the storage medium 706 may include a processor-readable non-transitory storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 706 may include programming stored thereon. Such programming, when executed by the processing circuitry 702, can cause the processing circuitry 702 to perform one or more of the various functions and/or process steps described herein. In at least some examples, the storage medium 706 may include data streaming operations 716. The data streaming operations 716 are adapted to cause the processing circuitry 702 to receive stream video data or screen content data in the form of frames containing graphics command tokens and texture elements from a source device via the communications interface 704.

The storage medium 706 may also include application modules 720 which may each represent an application provided by an entity that manufactures the sink device 700, programming operating on the sink device 700, and/or an application developed by a third-party for use with the sink device 700. Examples of application modules 720 may include applications for gaming, shopping, travel routing, maps, audio and/or video presentation, word processing, spreadsheets, voice and/or calls, weather, etc.

According to one or more aspects of the present disclosure, the processing circuitry 702 is adapted to perform (independently or in conjunction with the storage medium 706) any or all of the processes, functions, steps and/or routines for any or all of the sink devices described herein. As used herein, the term "adapted" or "configured" in relation to the processing circuitry 702 may refer to the processing circuitry 702 being one or more of configured, employed, implemented, and/or programmed (in conjunction with the storage medium 706) to perform a particular process, function, step and/or routine according to various features described herein, for example, in FIG. 14.

Figure 10:
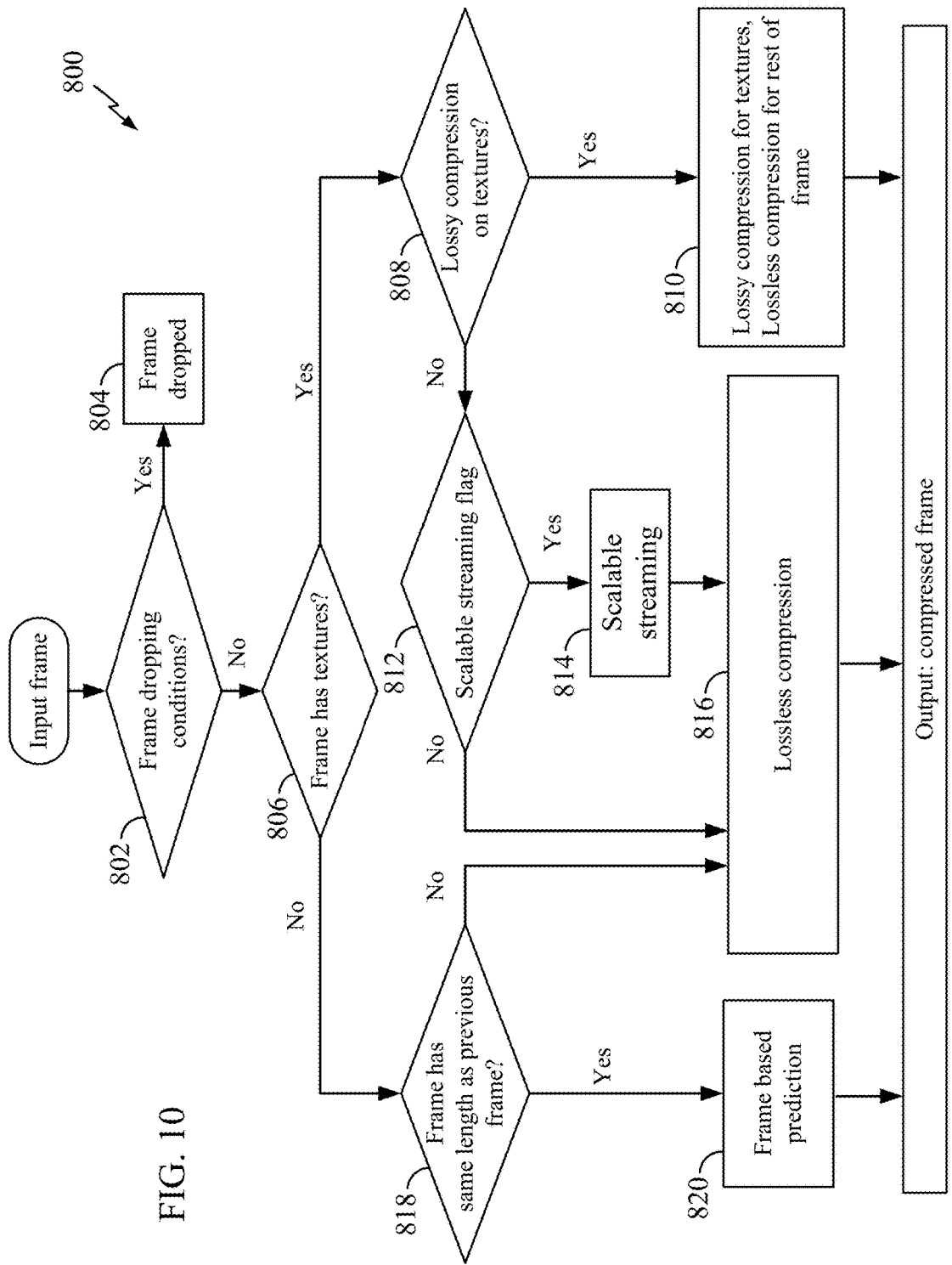
FIG. 10 is a flow chart illustrating a graphics pipeline compression method in accordance with some aspects of the disclosure.

FIG. 10 is a diagram illustrating an adaptive compression pipeline 800 in accordance with some aspects of the disclosure. This adaptive compression pipeline 800 may be implemented at a source device illustrated in any of FIGS. 1, 7, and 8 or any suitable apparatus. In one particular example, the source device 600 may be configured to utilize the adaptive compression pipeline 800 to process or compress graphics domain frames (at block 504) while performing the screen mirroring method 500 of FIG. 5. When a graphics domain frame containing graphics command tokens and/or textures (e.g., an OpenGL frame) arrives, the adaptive compression pipeline 800 can adaptively compress or reduce the size of the frame utilizing various compression tools or techniques so that the frame may be transmitted to a sink device in less time to reduce latency of the transmission.

Figure 11:
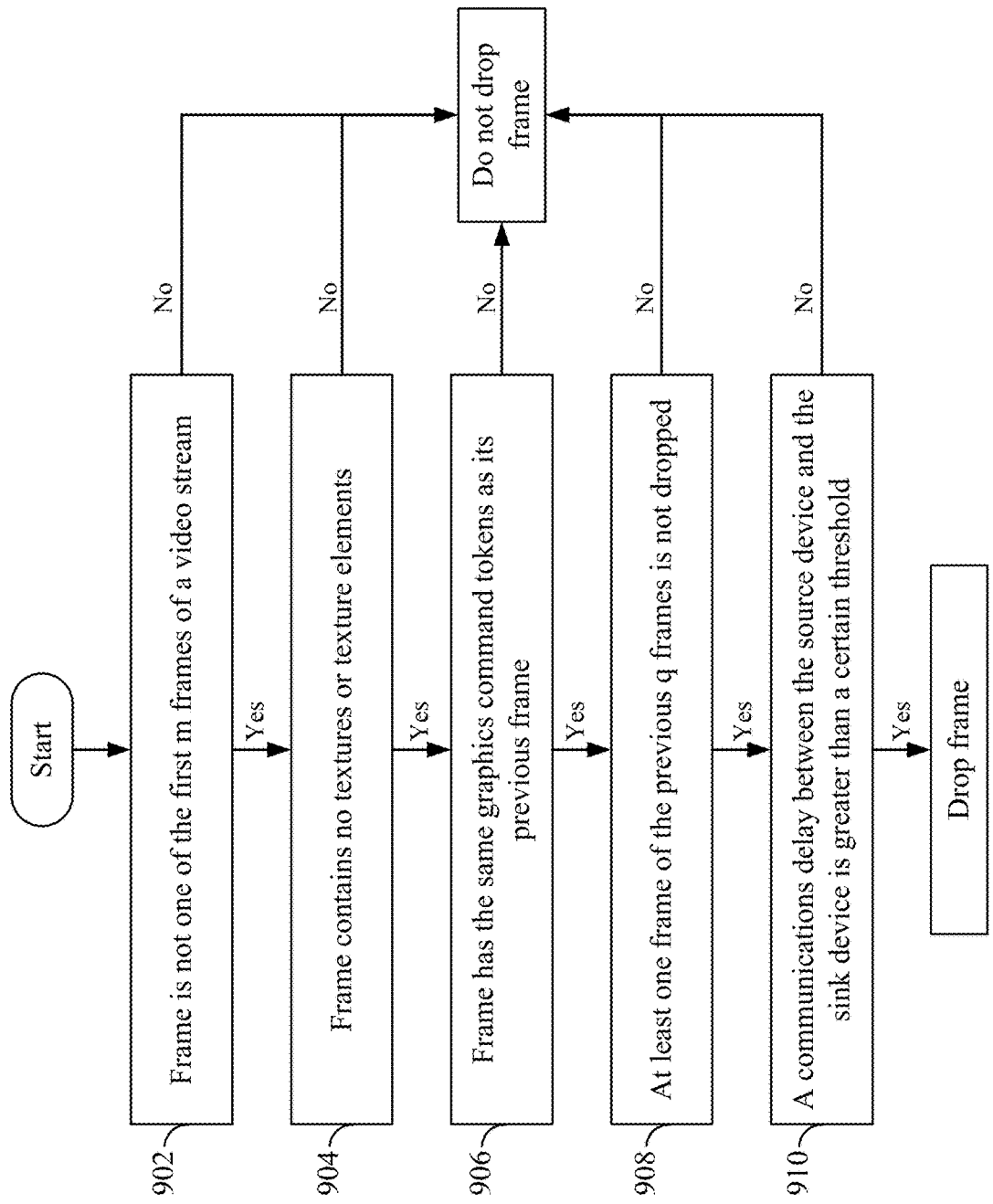
FIG. 11 is a flow chart illustrating a frame dropping method at a source device in accordance with an aspect of the disclosure.

At decision block 802, the source device may utilize its processing circuitry 602 to determine whether or not frame dropping is applied to the frame. If the frame meets certain criteria, the frame may be dropped at block 804. When a frame is dropped, it is not streamed or transmitted to the sink device, but it may still be rendered and/or displayed at the source device. Referring to FIG. 11, a frame may be dropped if all or some of the following conditions are met. At block 902, it is determined whether or not the frame is one of the first m frames of a video stream. In one example, the value of m may be equal to 2 or more, or any suitable value. At block 904, it is determined whether or not the frame contains textures or texture elements. For example, textures may provide the detail, surface texture or color of the surface of an object in the rendered frames. At block 906, it is determined whether or not the frame has the same graphics command tokens as its previous frame. For example, a frame no. f may have the same graphics command tokens as frame no. f+1. At block 908, it is determined whether or not at least one frame of the previous q frames was not dropped. For example, the value of q may be equal to 2 or more, or any suitable number. At block 910, it is determined whether or not a communications delay between the source device and the sink device is greater than a certain threshold. In one example, the threshold (i.e., maximum allowable screen-to-screen delay) may be 5 milliseconds. In one aspect of the disclosure, the source device may determine the delay by comparing the presentation timestamp of the current frame that will be sent against the current system time on the source device. This provides a good heuristic for the screen-to-screen delay calculation when the transmission delay is taken into account.

In one particular example, when all conditions of FIG. 11 are met, the frame may be dropped; otherwise, the frame is not dropped. In some examples, when only some conditions of FIG. 11 are met, the frame may be dropped. The conditions of FIG. 11 may be checked in any orders in sequence and/or in parallel, not limited to the particular order shown in the figure. In some aspects of the disclosure, some of the conditions may be omitted, and other conditions may be added. More information on frame dropping may be found in a copending patent application Ser. No. 14/589,481 filed with the United States Patent and Trademark Office on Jan. 5, 2015.

Referring back to FIG. 10, at decision block 806, the source device may utilize its processing circuitry 602 to determine whether or not the graphics domain frame has textures. If the frame has textures, the source device proceeds to decision block 808; otherwise, the source device proceeds to decision block 818. At block 808, the source device may utilize its processing circuitry 602 to decide whether or not to apply lossy data compression to the frame containing textures. At block 810, the source device may utilize its processing circuitry 602 to apply lossy compression to the data of the frame corresponding to textures, and lossless compression to the other data of the frame. For example, the source device may compress the textures using a lossy JPEG (Joint Photographic Experts Group) format.

In graphics, a pixel may be represented by three channels for red, green, and blue (RGB) and one alpha channel. The alpha channel specifies transparency, which defines how a pixel's R, G, and B colors are merged with another pixel when the two are overlaid, one on top of the other. In one particular example, the source device separates an RGB image (RGB channels) of a frame from an alpha channel, and compresses the RGB image as a JPEG image. In one example, the compressed JPEG image size may be represented in 23 bits. The source device may selectively compress the alpha channel based on the alpha channel's content. For example, if the alpha channel contains all ones (i.e., data bits all equal to 1), the source device may transmit a frame including an alpha flag with a value of 0 (or a predetermined value) to the sink device, but not sending the alpha channel data. If the alpha channel contains not all ones (i.e., ones and zeros data), the source device may compress the alpha channel to a JPEG grayscale image and transmit the frame including the JPEG grayscale image and an alpha flag with a value of 1 (or a predetermined value) to the sink device.

At decision block 812, the source device may utilize its processing circuitry 602 to decide whether or not to apply scalable texture streaming based on a scalable streaming flag maintained by the source device. For example, the scalable streaming flag may be set to a first value (e.g., scalable streaming flag=1) to enable scalable texture streaming, or set to a second value (e.g., scalable streaming flag=0) to disable scalable texture streaming. The scalable streaming flag may be set based on the communications bandwidth between the source device and the sink device, and/or any feedback provided by the sink device. For example, when the bandwidth is below a certain threshold, the source device may enable scalable texture streaming. In one example, when rendering quality at the sink device is unsatisfactory (e.g., excessive rendering artifacts), the source device may disable scalable texture streaming. An example of scalable texture streaming will be described below in FIG. 12.

Figure 12:
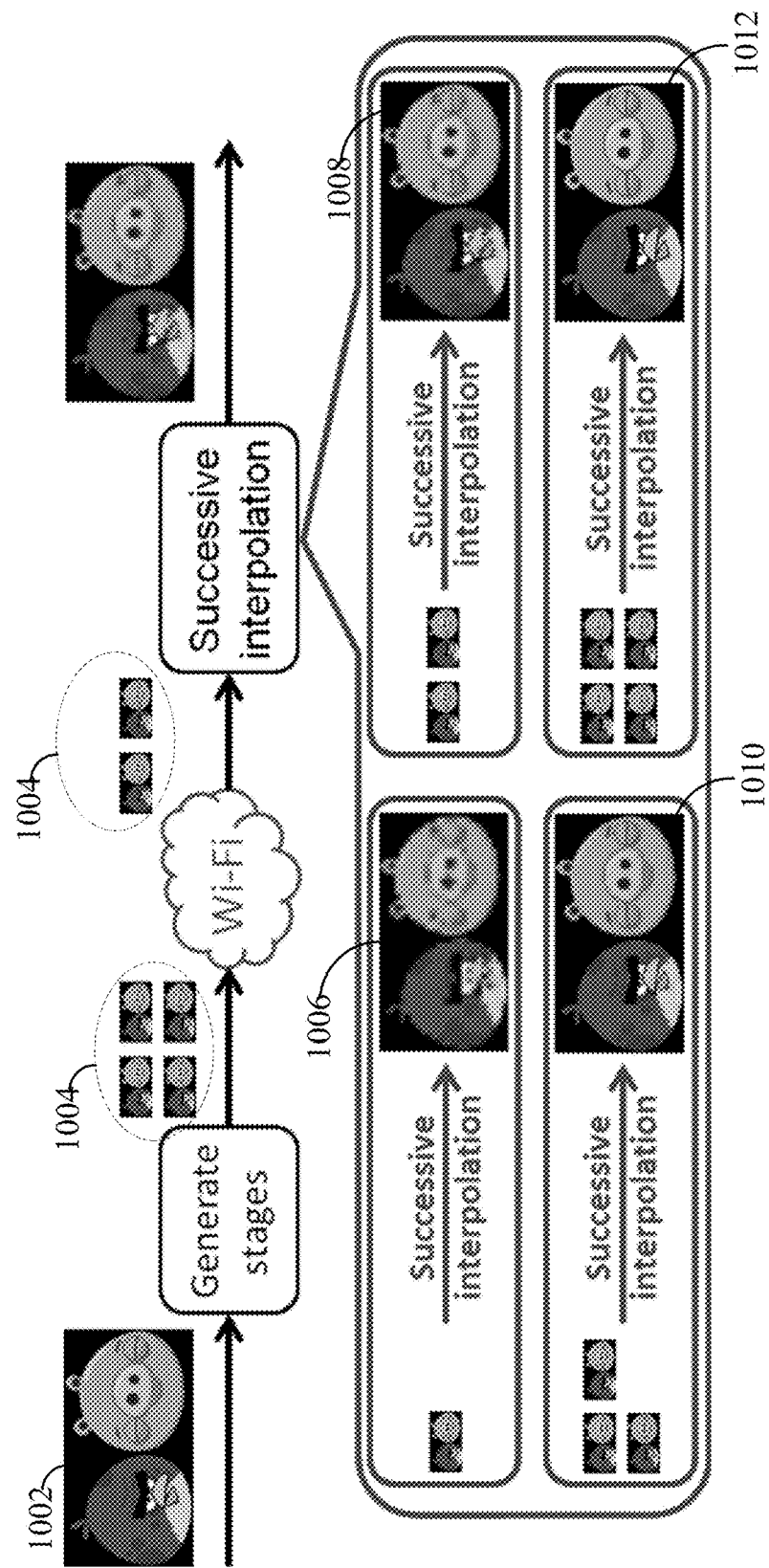
FIG. 12 is a diagram illustrating a scalable texture streaming process of a frame in accordance with an aspect of the disclosure.

At block 814, the source device may utilize its processing circuitry 602 to perform scalable texture streaming in accordance with one aspect of the disclosure. Referring to FIG. 12, in scalable texture streaming, the source device may divide a frame 1002 into a number of small stages 1004 or layers. Each of the small stages 1004 is smaller than the original frame 1002 in data size. Then the source device transmits the small stages 1004 separately in sequence to the sink device via a communications channel (e.g., Wi-Fi channel, cellular connection). The sink device may reconstruct or render a low quality image or frame 1006 of the original frame 1002 based on the first stage received. For example, the low quality image 1006 may have lower resolution than the original frame. Later stages provide refinement bits or data to the sink device such that progressively better quality images (e.g., images 1008 and 1010) may be constructed. In one example, the sink device may apply successive interpolation to the stages to generate the images. Finally, the quality of a frame 1012 constructed with all the stages may approach or have substantially the same image quality of the original frame 1002.

Referring back to FIG. 10, at block 816, the source device may utilize its processing circuitry 602 to apply lossless compression to the data (e.g., command tokens) of the graphics domain frame containing no textures when the scalable streaming flag is not set. In some examples, generally known lossless data compression techniques such as zlib, LZ4, and LZO (Lempel-Ziv-Oberhumer) may be used. While applying data compression may reduce transmission latency by streaming smaller frames, performing data compression may increase processing time. Therefore, the source device may selectively apply compression (e.g., zlib, LZ4, and LZO) based on a number of criteria such as the channel bandwidth and processing time of performing compression. In general, the source device may select to apply data compression if it can reduce the overall latency while taking into account of the processing time of performing compression and the transmission time of the compressed frame.

Figure 13:
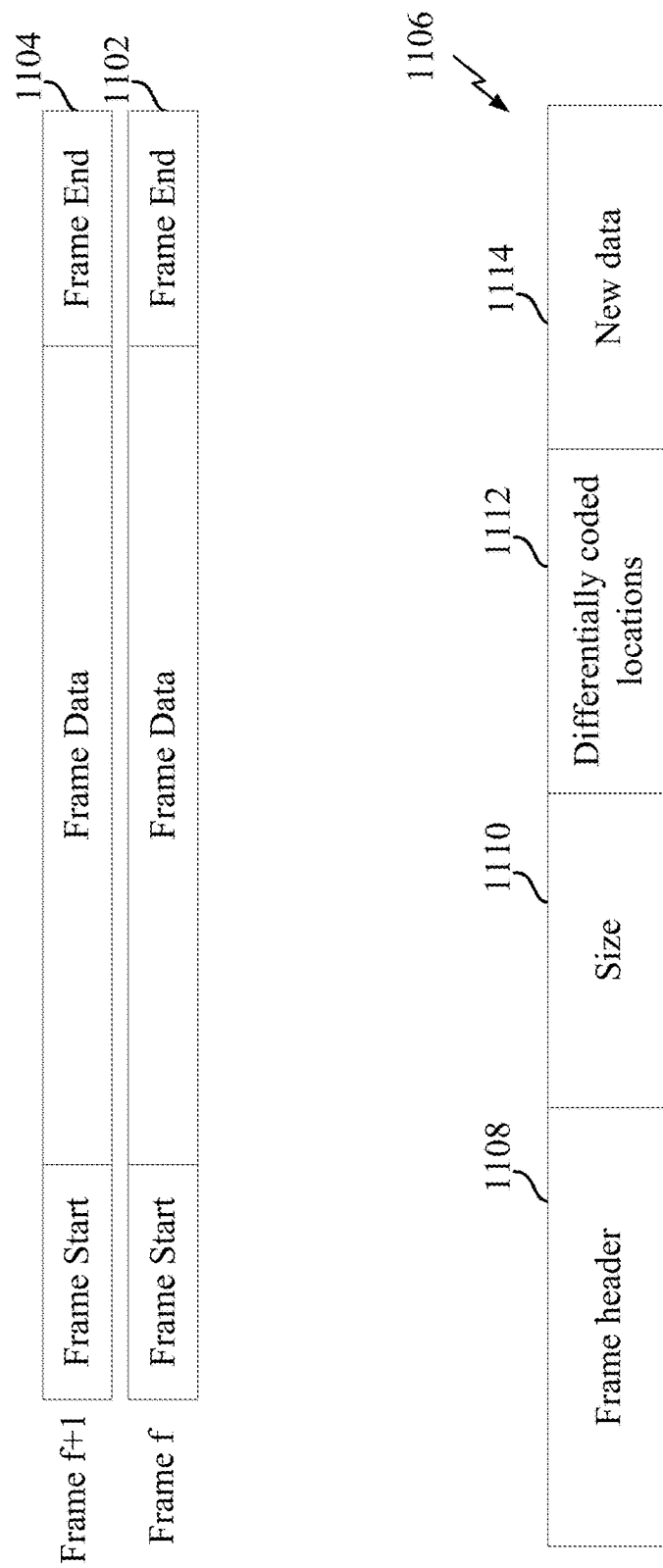
FIG. 13 is a diagram illustrating two frames with the same length and a frame structure of a frame utilized in frame-based prediction in accordance with an aspect of the disclosure.

At decision block 818, the source device may utilize its processing circuitry 602 to decide whether or not to perform frame-based prediction based on the length of the graphics domain frame. In one aspect of the disclosure, if a current frame (e.g., frame f+1) and its previous frame (e.g., frame f) have the same length, the source device may utilize its processing circuitry 602 to perform frame-based prediction to compress or reduce the size of the current frame at block 820. FIG. 13 is a diagram illustrating frame-based prediction on two consecutive frames 1102 and 1104 (frames f and frames f+1) that have the same length. In an illustrative example, the locations that the two frames contain different data may be byte locations 70, 71, 72, 80, 113, 114, 158, 159, 160, 161, and 188. In one aspect of the disclosure, the source device may differentially encode these locations as 70, 1, 1, 8, 33, 1, 44, 1, 1, 1, and 27. In this particular example, because the first location is location 70, the second location 71 may be encoded as 1 (i.e., 71=70+1). Similarly, the third location 72 may be encoded as 1 (i.e., 72=71+1), the fourth location 80 may be encoded as 8 (i.e., 80=72+8), and so on. In other aspects of the disclosure, other encoding schemes may be used.

In various aspects of the disclosure, the source device may encode the differential locations (i.e., same locations of the frames having different data) using any suitable coding schemes. In one particular example, the source device may encode the differential locations using exponential-Golomb coding. In one particular example, the encoded differential locations become 0000001000110 (i.e., location 70), 1, 1, 0001000, 00000100001, 1, and so on. After encoding, the source device transmits a frame 1106 (FIG. 13) with the coded differential locations and the new/different data of these locations to the sink device.

Referring to FIG. 13, in frame-based prediction, the graphics domain frame structure 1106 includes a frame header 1108, a size field 1110, a differentially coded locations field 1112, and a new data field 1114. The frame header 1108 marks the beginning of the frame and indicates application of frame compression (e.g., frame-based prediction) applied to this frame. The size field 1110 indicates the size of the coded locations. In one specific example, the size of the size field 1110 may be two bytes (2B). The coded locations themselves may be variable in length. These two bytes help the decoder of the sink device to parse the number of bytes containing the differentially coded locations. The differentially coded locations field 1112 indicates the locations where the frame contains new data (i.e., different data). The new data field 1114 provides the values of the new data. Accordingly, the sink device may construct the frame f+1 based on the previous frame f and the frame 1106, which contains the locations of the different/new data. The frame 1106 may have a smaller size or length than the frame f+1 1104 such that the transmission latency may be reduced.

Referring back to FIG. 10, at decision block 818, if the source device decides not to perform frame-based prediction, it may perform lossless compression on the frame at block 816 as described above. The graphic command frame compression tools and techniques illustrated in FIGS. 10-13 are not exhaustive. In some aspects of the disclosure, a source device may not implement some of these frame compression tools, and may include other suitable frame compression tools within the scope of the present disclosure.

In order to achieve zero latency or non-perceptible latency screen mirroring, the source device and the sink device may be synchronized to a global clock source (e.g., time reference 110 of FIG. 1) such that the devices can regulate and control the time a particular frame is rendered and/or displayed on a display or screen. In some examples, the sink device may derive the time from the data received from the source device. In this disclosure, non-perceptible latency screen mirroring may have a latency less than 5 milliseconds or a latency that a human viewer cannot perceive a noticeable delay between the images displayed by the source and sink devices. In one example, the source device and the sink device may be synchronized to a suitable clock source using the Network Time Protocol (NTP). In one example, the source device and the sink device may be synchronized to a clock source using the Timing Synchronization Function (TSF) from the same Wi-Fi network to which both devices are connected to. In one aspect of the disclosure, if the frames have audio and video components, the audio component may be captured early on the source side at the application layer. When audio data arrive at the sink side, they are synchronized to the same global clock source used to synchronize the video playback. The global clock source may be based on NTP, TSF, or Wi-Fi.

Figure 14:
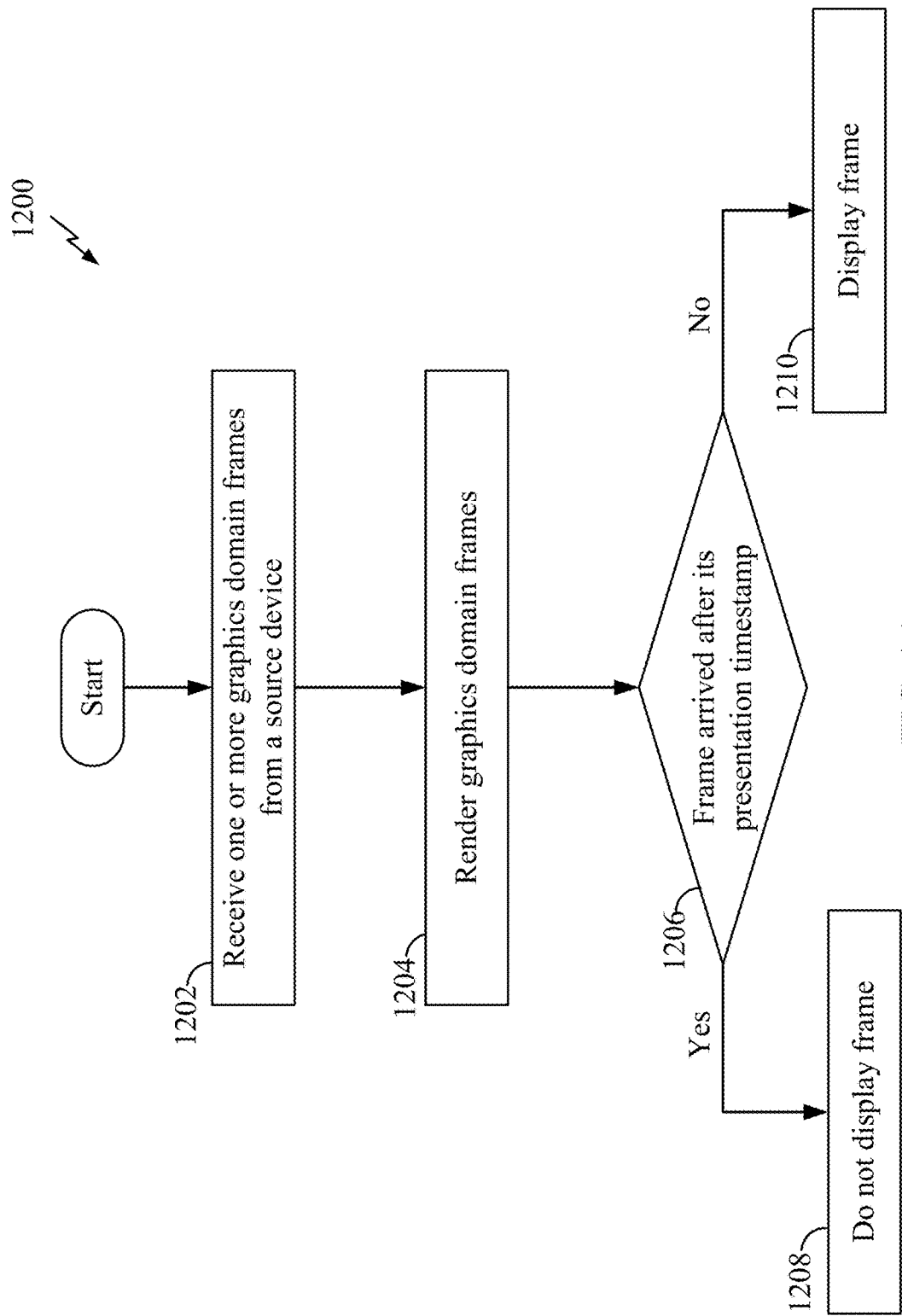
FIG. 14 is a flow chart illustrating a sink side frame dropping method in accordance with an aspect of the disclosure.

FIG. 14 is a flow chart illustrating a sink side frame dropping method 1200 in accordance with an aspect of the disclosure. The sink side frame dropping method 1200 may be performed by the sink device 700 of FIG. 9 or any suitable apparatus. At block 1202, the sink device may utilize its communications interface 704 (FIG. 9) to receive one or more graphics domain frames from a source device (e.g., source device 102 of FIG. 1). For example, each of the frames may include one more graphics command tokens and/or textures similar to the frame 200 illustrated in FIG. 2. The frames may be compressed at the source device by an adaptive compression pipeline similar to that described in FIGS. 6 and 10. The adaptive compression pipeline can be configured to compress or process the frames using scalable texture streaming, frame-based prediction, frame dropping, or lossy/lossless data compression as described above in FIGS. 10-13.

At block 1204, the sink device renders the graphics domain frames for display for example utilizing its processing circuitry 602 and/or GPU 608 (FIG. 7). At decision block 1206, if the frame arrives after its presentation timestamp, the sink device does not display this frame at block 1208; otherwise, the sink device displays the frame at block 1210. When sink device refrains from displaying the dropped frame (e.g., not displayed, forgone, dropped, or discarded), the sink device may still execute the graphics commands of the dropped frame for example by its GPU.

While the above-discussed aspects, arrangements, and embodiments are discussed with specific details and particularity, one or more of the components, steps, features and/or functions illustrated in FIGS. 1-14 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 1, 7, 8, and/or 9 may be configured to perform or employ one or more of the methods, features, parameters, and/or steps described in FIGS. 1, 5, 6 and/or 10-14. The novel algorithms and procedures described herein may also be efficiently implemented in software and/or embedded in hardware, or a combination thereof.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associated with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A source device, comprising:
   a communications interface;
   a memory storing executable code; and at least one processor communicatively coupled to the communications interface and the memory, wherein the at least one processor and the memory are configured to:

capture a plurality of graphics domain frames, each of the graphics domain frames comprising one or more graphics command tokens, wherein the plurality of graphics domain frames comprise no rendered graphics;

compress the plurality of graphics domain frames by using an adaptive compression pipeline to select a compression technique from: (a) scalable texture streaming configured to divide a frame into a plurality of stages that are smaller than the frame and transmit the plurality of stages in sequence, (b) frame-based prediction using differentially coded locations to identify portions of two consecutive frames that contain different data from one another, (c) frame dropping, and (d) data compression, based on a plurality of characteristics of the frames to facilitate screen mirroring at a sink device with non-perceptible screen-to-screen latency;

transmit the compressed frames via the communications interface to the sink device; and display a rendered image of the graphics domain frames in time synchronization with a corresponding rendered image of the compressed frames displayed at the sink device with non-perceptible screen-to-screen latency.

2. The source device of claim 1, wherein, for the frame dropping, the at least one processor and memory are further configured to drop a first frame of the plurality of graphics domain frames in connection with a predetermined condition comprising at least one of:

the first frame following a predetermined number of second frames leading the plurality of graphics domain frames;

the first frame comprising no textures;

the first frame and a previous frame of the first frame comprising a same command token;

at least one frame of a predetermined number of previous frames of the first frame not being dropped; or a communications delay between the source device and the sink device being greater than a threshold duration.

3. The source device of claim 1, wherein, for the scalable texture streaming, the at least one processor and memory are further configured to:

divide a first frame of the plurality of graphics domain frames into a plurality of stages, wherein the first frame comprises textures; and transmit the compressed frames comprising the plurality of stages in sequence to the sink device, wherein the first frame is configured to be rendered at the sink device by successive interpolation of the stages.

4. The source device of claim 1, wherein, for the frame-based prediction, the at least one processor and memory are further configured to:

if two consecutive frames of the plurality of graphics domain frames are equal in length:

determine one or more same locations of the two consecutive frames where the same locations have different data;

encode the locations corresponding to the different data; and transmit the compressed frames comprising the encoded locations and the different data to the sink device.

5. The source device of claim 1, wherein, if a first frame of the plurality of graphics domain frames comprises textures, the at least one processor and memory are further configured to:

separate a red green and blue (RGB) image from an alpha channel of the textures;

compress the RGB image utilizing lossy compression; and selectively compress the alpha channel by lossy compression based on a content of the alpha channel.

6. The source device of claim 1, wherein the graphics command tokens comprise OpenGL (Open Graphics Library) command tokens.

7. The source device of claim 1, wherein the characteristics comprise frame number, frame length, differences of data between adjacent frames, presence of textures, number of command tokens contained in a frame, and presentation timestamp.

8. A sink device, comprising:

a communications interface;

a memory comprising executable code; and at least one processor communicatively coupled to the communications interface and the memory, wherein the at least one processor and the memory are configured to:

receive a plurality of graphics domain frames comprising no rendered graphics from a source device via the communications interface, wherein each of the graphics domain frames comprises one or more graphics command tokens, and the plurality of graphics domain frames are compressed by using an adaptive compression pipeline to select a compression technique from (a) scalable texture streaming configured to divide a frame into a plurality of stages that are smaller than the frame and transmit the plurality of stages in sequence, (b) frame-based prediction using differentially coded locations to identify portions of two consecutive frames that contain different data from one another, (c) frame dropping, and (d) data compression; and display a rendered image of at least some of the plurality of graphics domain frames in time synchronization with a corresponding rendered image displayed at the source device with non-perceptible screen-to-screen latency by refraining from displaying one or more of the plurality of graphics domain frames based on a timestamp of each of the plurality of frames.

9. The sink device of claim 8, wherein the at least one processor and the memory are further configured to refrain from displaying a first frame of the plurality of graphics domain frames if the first frame is received after the timestamp of the first frame.

10. The sink device of claim 9, wherein the at least one processor and the memory are further configured to render the first frame.

11. The sink device of claim 8, wherein the at least one processor and the memory are further configured to refrain from displaying a frame of the plurality of graphics domain frames if the frame arrives at the sink device after a timestamp of the frame.

12. The sink device of claim 8, wherein the one or more graphics command tokens comprise OpenGL (Open Graphics Library) command tokens.

13. A method of screen mirroring operable at a source device, comprising:

capturing a plurality of graphics domain frames of screen content, each of the frames comprising one or more graphics command tokens, wherein the plurality of graphics domain frames comprise no rendered graphics;

compressing the plurality of graphics domain frames by using an adaptive compression pipeline to select a compression technique from (a) scalable texture streaming configured to divide a frame into a plurality of stages that are smaller than the frame and transmit the plurality of stages in sequence, (b) frame-based prediction using differentially coded locations to identify portions of two consecutive frames that contain different data from one another, (c) frame dropping, and (d) data compression, based on a plurality of characteristics of the frames to facilitate screen mirroring at a sink device with non-perceptible screen-to-screen latency;

transmitting the compressed frames via a communications interface of the source device to the sink device; and displaying a rendered image of the frames in time synchronization with a corresponding rendered image of the compressed frames displayed at the sink device with non-perceptible screen-to-screen latency.

14. The method of claim 13, wherein, for the frame dropping, the compressing comprises dropping a first frame of the plurality of graphics domain frames regarding a predetermined condition comprising at least one of:

the first frame following a predetermined number of second frames leading the plurality of frames;

the first frame comprising no textures;

the first frame and a previous frame of the first frame comprising a same command token;

at least one frame of a predetermined number of previous frames of the first frame not being dropped; or a communications delay between the source device and the sink device being greater than a threshold duration.

15. The method of claim 13, wherein, for the scalable texture streaming, the compressing comprises:

dividing a first frame of the plurality of graphics domain frames into a plurality of stages, wherein the first frame comprises textures; and transmitting the compressed frames comprising the plurality of stages in sequence to the sink device, wherein the first frame is rendered at the sink device by successive interpolation of the stages.

16. The method of claim 13, wherein, for the frame-based prediction, the compressing comprises:

if two consecutive frames of the plurality of graphics domain frames are equal in length:

determining one or more same locations of the two consecutive frames where the same locations have different data;

encoding the locations corresponding to the different data; and transmitting the compressed frames comprising the encoded locations and the different data to the sink device.

17. The method of claim 13, wherein, the compressing comprises:

if a first frame of the plurality of graphics domain frames comprises textures:

separating a red green and blue (RGB) image from an alpha channel of the textures;

compressing the RGB image utilizing lossy compression; and selectively compressing the alpha channel by lossy compression based on a content of the alpha channel.

18. The method of claim 13, wherein the graphics command tokens comprise OpenGL (Open Graphics Library) command tokens.

19. The method of claim 13, wherein the characteristics comprise frame number, frame length, differences of data between adjacent frames, presence of textures, number of command tokens contained in a frame, and presentation timestamp.

20. A method of screen mirroring operable at a sink device, comprising:

receiving a plurality of graphics domain frames comprising no rendered graphics from a source device via a communications interface of the sink device, wherein each of the graphics domain frames comprises one or more graphics command tokens, and the plurality of graphics domain frames are compressed at the source device by using an adaptive compression pipeline to select a compression technique from (a) scalable texture streaming configured to divide a frame into a plurality of stages that are smaller than the frame and transmit the plurality of stages in sequence, (b) frame-based prediction using differentially coded locations to identify portions of two consecutive frames that contain different data from one another, (c) frame dropping, and (d) data compression; and displaying a rendered image of at least some of the plurality of graphics domain frames in time synchronization with a corresponding rendered image displayed at the source device with non-perceptible screen-to-screen latency by refraining from displaying one or more of the plurality of graphics domain frames based on a timestamp of each of the plurality of graphics domain frames.

21. The method of claim 20, further comprising refraining from displaying a first frame of the plurality of graphics domain frames if the first frame is received after the timestamp of the first frame.

22. The method of claim 21, further comprising rendering the first frame.

23. The method of claim 20, further comprising refraining from displaying a frame of the plurality of graphics domain frames if the frame arrives at the sink device after a timestamp of the frame.

24. The method of claim 20, wherein the one or more graphics command tokens comprise OpenGL (Open Graphics Library) command tokens.

* * * * *